Feb. 7, 1933.  E. W. COVEY  1,896,574
PROCESS FOR MAKING A NONSKID TIRE FOR VEHICLE WHEELS
Filed Feb. 27, 1931  2 Sheets-Sheet 2
Fig.3.
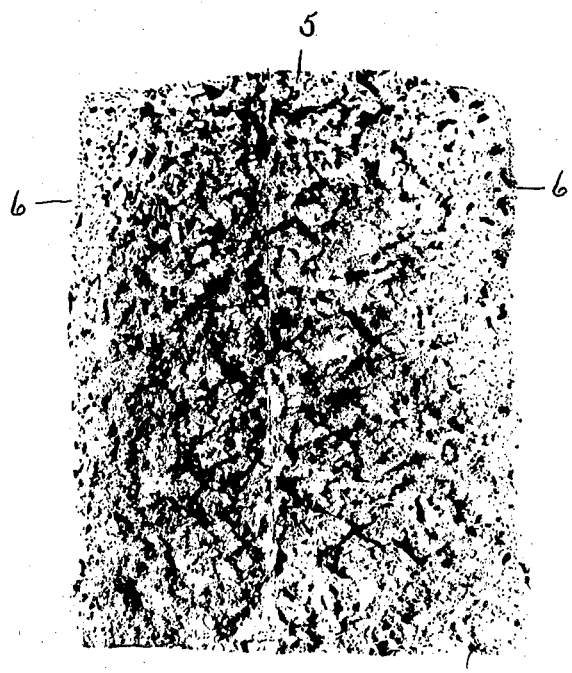
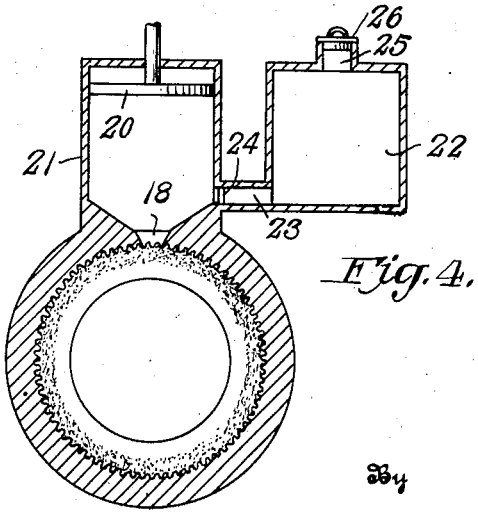
Fig.4.
Inventor
Earl W. Covey
By Thomas L. Wilder
Attorney Patented Feb. 7, 1933

1,896,574

UNITED STATES PATENT OFFICE

EARL W. COVEY, OF BIG MOOSE, NEW YORK

PROCESS FOR MAKING A NONSKID TIRE FOR VEHICLE WHEELS

Application filed February 27, 1931. Serial No. 518,771.

My invention relates to a process for making a non-skid tire for vehicle wheels, and I declare the following to be a full, clear, concise and exact description thereof sufficient to enable anyone skilled in the art to which it appertains to make and use the same, reference being had to the accompanying drawings in which like reference characters refer to like parts throughout the specification.

The object of the invention is to provide a process or method for making a non-skid tire for vehicle wheels that will give the riders in the automobile perfect assurance against the lateral skidding or turning of the car and also allow them to ride with perfect comfort.

Such a tire will have a coarse, irregular, rough, wartlike, yielding tread surface, to prevent the tire from skidding or sliding laterally, especially when the vehicle is traveling over slippery wet pavements, ice-covered roads or other hazardous surfaces, and yet not being injurious to the surface of the road, or the riding qualities of the tire.

Furthermore the process is intended to provide a tire of the pneumatic type that will have all of the easy riding qualities thereof, and none of the hazards incident thereto.

Moreover a tire made from such a process will be found useful to aid the automobile in traveling over any hazardous surface, whether it be making the grade of an ice-covered mountain road or extricating it from a mud-hole or quagmire.

Tires made from such a process will have a tendency to stick to or grip the surface of the road. The coarse, irregular, wartlike, soft springy surface prevents the snow from packing in the tread, and thereby produces sufficient traction to allow the driver of the automobile to travel safely over any and all conditions of the roads.

Not only will the tire made from the aforesaid process accomplish the results mentioned but it will do so without injuring in any way the tire or the hardened surface of the pavement, and in addition will tend to prolong the life of the tire as well as increase the ease and smoothness of its riding qualities.

The object will be understood by referring to the drawings in which,

Fig. 3 shows a plan view of the sector.

Fig. 4 is a diagrammatic view showing a central vertical section of the mold and immediate parts.

Figure 1:
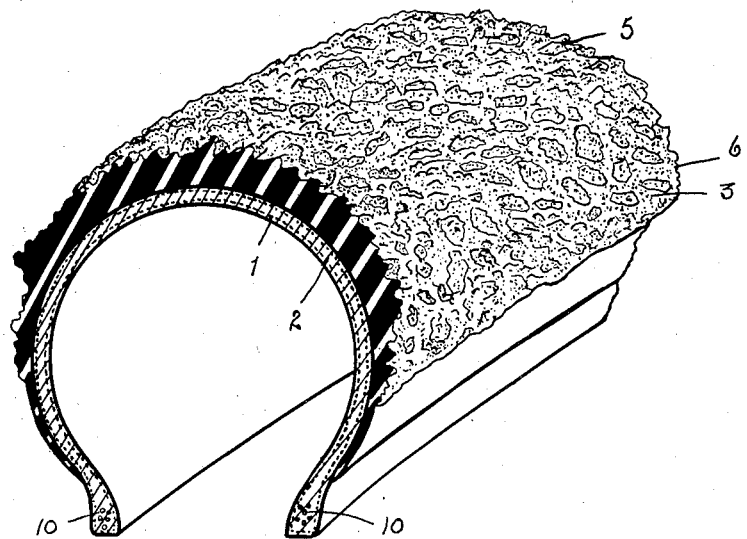
Fig. 1 shows a sector of the tire in perspective.
Figure 2:
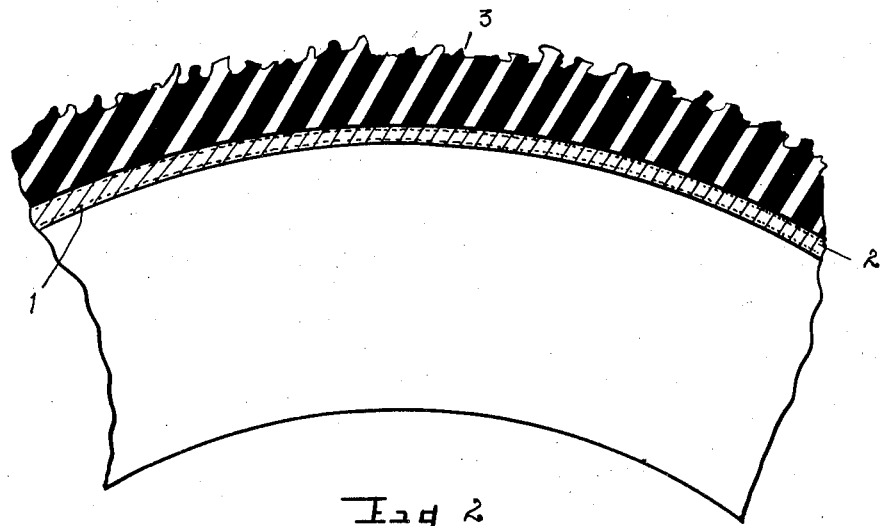
Fig. 2 shows a vertical section of the sector of the tire.

Referring more particularly to the drawings the process or method of making a tire of the solid or pneumatic including the balloon type is effected by weaving a cord fabric 1 that is intermeshed with rubber 2 and then by molding integral therewith an outer rubber covering, layer or tread surface 3. To this end the tire comprising the cord fabric 1 and rubber 2 is placed in a mould having an irregular, roughened, protuberant wartlike surface. A pure gum solution or latex is poured then into the mould, whereby to form integral with the outer tread surface and part of walls of the tire, a covering 3 that will have an irregular, roughened, protuberant, wartlike surface, which has the appearance of a stucco finish on buildings. The mold hereinabove mentioned is made from babbitt metal. It is shown in Fig. 4. The contour of the mold which forms the outer or tread surface of the tire is made by using in the first instance, a dummy or model tire made of wood over which has been disposed a crepe sheet or a sheet of crepe rubber. The dummy thus covered is then placed in a metallic casing 15 and held or suspended a predetermined distance from the lateral side and bottom surface of the casing 15. Babbitt metal in the molten or flux state is then poured into the casing 15 about the tire. The metal sets quickly and thereby forms one-half of the mold.

A duplicate of the mold as above described is made. This duplicate and the original one-half are each provided with flat upper surfaces whereby they will fit together in a perfect manner.

A dummy after being used to form the mold is removed and leaves a channel for the disposition of the carcass of a pneumatic tire to which the crepe surface is to be applied.

The mold is now ready for making non-skid tires having a crepe rubber surface. The process of molding consists of building up a pneumatic tire in the usual way. The tire is disposed in one of the one-half sections of the mold. The other section is placed in position over the first section. The mold with the tire thus sandwiched in between the two sections is placed between two presses to press the parts of the mold together whereupon they are locked and held in a liquid tight manner. A pure gum solution or latex is poured then into the mold through an aperture 18. After this the mold is disposed either in a steam bath or hot water bath, whereby to vulcanize or cure the parts of the tire.

In order to insure that the latex completely covers the tread and side portions of the tire, it is forced into the mold by a piston 20 operating in a chamber formed by casing 21. The solution of latex is drawn into chamber 21 from storage tank 22 through a channel 23 having a one way valve 24 on the upward or section stroke of piston 20.

Storage tank 22 is supplied with the solution of latex through a port or throat portion 25 having a cover 26.

Although the tread portion is made in a mould as stated above, it may be made by spraying said pure gum rubber solution on the outer or exterior surface of the cord fabric 1 mounted with rubber 2, whereby to completely cover the tread 5 and a portion of the side walls 6. The pure rubber solution or latex that is used for spraying to provide a roughened, serrated and uneven surface on the tread of the tire will increase the traction qualities thereof as stated heretofore.

It may be found desirable to make the rubber solution of pure rubber or to make a composition by adding some foreign substance such as cork. The compound will possess however the qualities that would produce a soft, gummy, resilient, yielding surface as a tread to come in contact with the road surface to aid in effecting traction thereon.

The exterior surface of the rubber formed in the tread 5 and a portion of the side walls 6 of the tire will have the appearance in the finished tire of a rough, wartlike surface.

The process contemplates covering the entire surface of the tread 5 and a portion of the side walls 6 of the tire with this rubber solution or latex to form thereon a coarse roughened surface composed of irregular, uneven depressions and wartlike protuberances. These projections or elevations effect a very rough, irregular surface on the tire that will aid in the traction thereof, by causing the surface of the tire to stick to snow or ice rather than slip thereon as heretofore, especially with chains or hard smooth rubber tires.

Moreover the process of forming the tire with such a tread will present a more yielding surface for contact with the hard surface of the road. It will have also the advantage in wearing and yielding qualities, whereby to prolong the life of the tire. It follows also that this yielding quality will subject the automobile to less vibration and therefore prolong its life.

Small wires 10 are embedded in the free edges of the tire to lend strength to those portions that are held by the flanges of the rim, when the tire is mounted thereon.

Having thus described my invention what I claim as new and desire to secure as Letters Patent is as follows:

1. In a process for making a non-skid tire by forming the body of the tire by weaving a cord fabric intermeshed with rubber and molding on its outer surface a layer of rubber latex, whereby to form an integral portion that will provide a rough serrated yielding surface, to prevent skidding.

2. In a process for making a non-skid tire by forming a body portion, placing said body portion in a mold and pouring a rubber latex into said mold to form a rough outer surface upon said tire.

3. In a process for making a non-skid tire by forming a tire carcass and placing said carcass in a mold made of two parts having a rough surface, joining the parts of said mold together, whereby to enclose the entire carcass and pouring into the mold a rubber latex to form a rough tread surface on said tire.

In testimony whereof I have affixed my signature.

EARL W. COVEY.